T. Van Wagoner,
Curtain Roller.
No. 98,649.                    Patented Jan. 4, 1870.
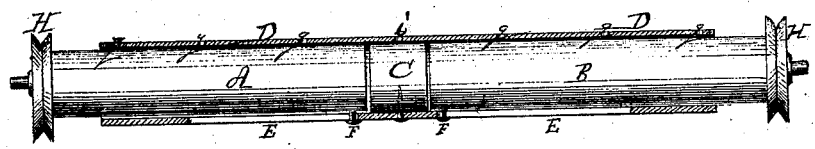
Witnesses:
A. W. Almquist,
Alex T. Roberts.
Inventor:
T. Vanwagoner
per Munn & Co
Attorneys.

United States Patent Office.

THOMAS VAN WAGONER, OF NEWARK, NEW JERSEY.

Letters Patent No. 98,649, dated January 4, 1870.

IMPROVED EXTENSION CURTAIN-ROLLER.

The Schedule referred to in these Letters Patent and making part of the same.

*To all whom it may concern:*

Be it known that I, THOMAS VAN WAGONER, of Newark, in the county of Essex, and State of New Jersey, have invented a new and useful Improvement in Extension Curtain-Roller; and I do hereby declare that the following is a full, clear, and exact description thereof, which will enable others skilled in the art to make and use the same, reference being had to the accompanying drawings, forming part of this specification.

This invention relates to improvement in rollers for window-curtains, and consists in making the roller in two parts, adjustable from the centre, by means of a slotted tube, with a stationary central section of wood in the tube, to which the central portion of the curtain is nailed, as will be hereinafter more fully described.

The accompanying drawing represents a longitudinal section of a curtain-roller, constructed according to my invention.

Similar letters of reference indicate corresponding parts.

A and B represent the parts of the roller which are adjustable from the central stationary piece C.

D is a metallic tube, of a length sufficient to support the parts of the rod when they are extended, and to allow of their extension.

E E represent slots in the tube, each side of the centre-piece C; and

F F represent pins in the parts of the roller which limit the amount of extension, but slide in the slots when the roller is extended to suit the width of the window.

*g* represents perforations through the tube, through which tacks or screws may be driven for keeping the parts of the roller extended or in place.

The stationary centre-piece C may be of a length sufficient to receive two or more nails or tacks, *i*, for supporting the middle of the curtain. This piece is made fast in the tube by means of one or more screws or nails.

The ends of the parts of the roller are turned off square in a lathe, and cord-pulleys H H are securely fastened at each end of the roller, as seen in the drawing. This not only obviates the necessity of sawing or cutting off the end of the rod to make it fit the window, and the putting on of a pulley, (in a very imperfect manner, as it is usually done,) but it allows the cord to be attached at either side of the window.

By this arrangement the curtain-roller is always ready, and may be put up by any female, without cutting or the use of any tool but the tack-hammer.

Having thus described my invention,

I claim as new, and desire to secure by Letters Patent—

The centre-piece C and tube D, provided with the slots E E, in combination with the parts A and B, as shown and described.

THOMAS VAN WAGONER.

Witnesses:
ANDREW S. FOWLE,
GEORGE W. DUNN.